(12) United States Patent
Augustin et al.

(10) Patent No.: US 7,817,654 B2
(45) Date of Patent: Oct. 19, 2010

(54) TEST DEVICE AND A TEST METHOD

(75) Inventors: Olav Augustin, Stuttgart (DE); Jochen Braun, Reutlingen (DE); Markus Fischer, Stuttgart (DE); Martin Gossner, Hemmingen (DE)

(73) Assignee: Vector Informatik GmbH, Stuttgart (DE)

( * ) Notice: Subject to any disclaimer, the term of this patent is extended or adjusted under 35 U.S.C. 154(b) by 212 days.

(21) Appl. No.: 12/127,715

(22) Filed: May 27, 2008

(65) Prior Publication Data

US 2009/0041047 A1 Feb. 12, 2009

(30) Foreign Application Priority Data

May 26, 2007 (EP) .................................. 07010536

(51) Int. Cl.
*H04L 12/28* (2006.01)
*H04L 12/56* (2006.01)

(52) U.S. Cl. ...................... 370/412; 370/402; 702/122; 709/253

(58) Field of Classification Search ................. 370/402, 370/412; 702/122; 709/253
See application file for complete search history.

(56) References Cited

U.S. PATENT DOCUMENTS

2002/0037007 A1* 3/2002 Gross et al. .................. 370/389
2007/0032916 A1* 2/2007 Mark ............................. 701/1
2008/0137679 A1* 6/2008 Horst et al. .................. 370/428
2008/0253376 A1* 10/2008 Charzinski ............... 370/395.2

FOREIGN PATENT DOCUMENTS

EP 1085722 A 3/2001
EP 1624620 A 2/2006

OTHER PUBLICATIONS

Techmer A., et al., "Implementing Flexray on Silicon", Networking, International Conference on Systems and International Conference on Mobile Communications and Learning Technologies, 2006, pp. 34, NJ, USA.

* cited by examiner

*Primary Examiner*—Pankaj Kumar
*Assistant Examiner*—Lonnie Sweet
(74) *Attorney, Agent, or Firm*—Browdy and Neimark, PLLC

(57) ABSTRACT

A test device and a test method, the test device comprising a bus controller for the transmission and reception of bus messages, the bus controller having a message memory for offering transmission data for bus messages, the message memory having a memory capacity for a bus message sequence with bus messages to be transmitted within a single transmission cycle or a transmission cycle sequence. The test device includes an intermediate memory for the storage of transmission data for bus messages with a larger storage capacity than the message memory. The test device furthermore comprises a transmission preparing means for reading transmission data from the intermediate memory and for writing, in advance of reading of the bus controller, to the message memory of the bus controller so that the bus message sequence is expanded by additional bus messages which are transmitted by the bus controller within the transmission cycle or the transmission cycle sequence on the motor vehicle bus.

13 Claims, 2 Drawing Sheets

TEST DEVICE AND A TEST METHOD

The invention relates to a test device and a test method for a motor vehicle bus, the test device comprising a bus controller for the transmission and reception of bus messages, the bus controller having a message memory for offering transmission data for bus messages, the message memory having a storage capacity for a bus message sequence with bus messages to be transmitted within a single transmission cycle or a transmission cycle sequence.

A typical bus controller for, to take an example, a FlexRay bus has a predetermined storage capacity in its message memory so that bus messages, which are to be transmitted within a bus message sequence on the motor vehicle bus, fit into the message memory. For example a bus controller for a FlexRay bus has a predetermined message capacity of for example approximately 40 to 70 bus messages. The bus messages to be transmitted in a sequence of transmission cycles are ready in the message memory. The bus controller may however not transmit any additional bus message but only those which are able to be stored in the message memory.

The storage capacity of the message memory is designed for typical tasks of a bus controller. The bus controller constitutes for example a component of a control module for the control of brakes, the engine or some other component of the motor vehicle such as a sensor or an actuator. For such typical control tasks the storage capacity of the message memory suffices. For analysis and simulation purposes on the other hand a larger memory capacity is required.

When for example a test device is to simulate several control units, actuators and sensors, it must possess a bus controller with for example a larger message memory capacity. Such bus controllers are however not available as standard components. As an alternative it would be possible to utilize several bus controllers in order to so increase the transmission capacity. This is however complex.

One object of the present invention is to increase the transmission capacity of a bus controller in a test device.

In order to achieve this object in a test device of the type initially mentioned there is a provision such that it comprises an intermediate memory for the storage of transmission data for bus messages with a larger storage capacity than the message memory and that the test device has a transmission preparing means for reading out the transmission data from the intermediate memory and for writing, ahead of reading by the bus controller, to the message memory of the bus controller so that the bus message sequence is expanded by additional bus messages, which are transmitted by the bus controller within the transmission cycle or the transmission cycle sequence on the motor vehicle bus. Furthermore the object is attained by a test method in accordance with the teaching of the invention as claimed in a further independent claim.

One principal notion of the invention is that the transmission preparing means inserts additional bus messages into the message memory which are to be transmitted within a transmission cycle or a transmission cycle sequence using the motor vehicle bus. The transmission preparing means functions in a manner ahead of the bus controller, i.e. it puts the bus message to be transmitted is ready in the message memory in good time, which is read by the bus controller.

The term "bus message sequence" may in the context of the invention mean that only a single bus message can be transmitted. Furthermore the bus message sequence may also include transmission interruptions, i.e. between the bus messages to be transmitted other bus subscribers may transmit messages. This is for example the case with a time division multiple access (TDMA) method. When the test device receives bus messages of other bus subscribers, the transmission cycle may be termed the transmission and reception cycle or transmission and reception cycle sequence.

In accordance with the invention a standardized bus controller, i.e. a standard component, can be employed. The storage capacity of the message memory does not have to be expanded. For example the bus controller may be a standardized software or hardware component.

The message memory constitutes a sort of buffer memory. The bus controller transmits, within a transmission cycle or transmission cycle sequence with several transmission cycles a larger number of bus messages than the storage capacity of its message memory would allow for as such.

The test device may for example be employed as a simulator and simulate several bus subscribers.

Preferably the bus controller reads the transmission data sequentially from the message memory. The transmission preparing means works ahead of the readout by the bus controller.

It will be clear that the message memory may be a plain transmission memory. It is preferred for the message memory to be a transmission and reception memory, in which the bus messages to be transmitted and received as well are stored.

Preferably the transmission preparing means include a head preparing means for writing head data to the message memory.

Furthermore the transmission preparing means have a user data preparing means for writing user data to the message memory. The head data serve for the production of heads of the bus messages, while the user data are provided for user data adjoining the message heads. The head preparing means operates ahead of the user data preparing means so that the head data are entered even prior to the start of a locked phase, in which the bus controller blocks writing of message heads to the message memory prior to the transmission of a respective bus message, but however the user data can not yet be modified. Accordingly the user data preparing means may still modify the user data, whereas the head data of a respective bus message have already been set. Even in this off time the bus controller prepares to transmit the respective bus message.

The head data are preferably provided in the message memory with an index or a pointer to a memory location, which indicates the respective user data of the bus message to be transmitted.

Admittedly the locked phase could be defined by a time related condition. Preferably however the locked phase is defined by an off number of bus messages for which the bus controller blocks the writing of message heads to the message memory. The bus controller for example blocks the head data for an off number (which is predetermined) of bus messages, which are to be transmitted following the bus message currently to be transmitted.

The storage capacity of the message memory is provided for a maximum number of bus messages dependent on the size of the bus messages. It is clear that in the case of large messages the storage capacity will merely suffice for less bus messages, while a larger number of smaller bus messages can be accommodated in the message memory.

The bus is preferably a time division multiple access (TDMA) bus. Preferably the bus is a FlexRay bus.

For reception of transmission data to be written to the intermediate memory the test device preferably possesses a control interface for an operating means, as for example a personal computer. As an application program the operating means preferably runs a test program, which communicates by way of a control interface where for example it defines the bus messages to be transmitted and/or the bus message to be received.

Preferably the test device is adapted to transmit acknowledging messages by way of the control interface, the acknowledging messages acknowledging bus messages transmitted on the motor vehicle bus by the bus controller. Accordingly the test program running on the PC as an example will indicate whether a bus message to be transmitted has in fact been sent. The bus controller for example marks in the message memory bus messages as "transmitted", when it has transmitted them on the bus.

The acknowledgement messages may completely or only partly contain the content of the bus messages. as for example the respective head data.

For the reception of bus messages with the aid of a standard bus controller the following measures are advantageous, which represent an invention in their own right:

Preferably the bus controller is namely adapted for writing bus messages of other subscribers to the message memory, which by other bus subscribers are sequence-transmitted after or between bus messages to be transmitted by the bus controller in or outside the bus messages. The other bus subscribers transmit bus messages for example between the respective bus messages transmitted by the bus controller of the test device within the transmission cycle or transmission cycle sequence.

A typical property of standard bus controllers is to receive many bus messages but not to forward them owing to lack of relevance, for example when they fail to contain any user data. In the case of a FlexRay bus they are for example so-called zero frames. For testing it is however an advantage if such zero frames or other bus messages which are as such otherwise discarded, are received and for example offered to the control interface for the PC. Preferably the test device will for this purpose have a receiving means setting control instructions for the bus controller to receive bus messages at certain slots of the motor vehicle bus.

The receiving means for example marks slots of the motor vehicle bus for the respective bus messages to be received in the message memory with a received mark, the bus controller recognizing on the basis of the received mark that it is to write the respective bus message to the slots provided with a received mark.

The respective memory locations are for example associated with the memory locations or slots of the motor vehicle bus. The memory locations will for example possess a slot mark.

The bus controller will preferably designate those memory locations, which are provided with a received mark, with a zero mark or a "nothing received mark", if at the respective memory location or slot no bus message has been received. The bus controller best describes those memory locations having a received mark with a zero information mark, for example a zero frame mark and more especially a frame flag, when the respective bus message for example comprises zero information, i.e. for example is a zero frame. The receiving means preferably issues the zero mark or "nothing received mark" or the zero information mark to the control interface.

Furthermore on reception preceding or ahead operation within the meaning of the invention is an advantage. The storage capacity of the reception memory, which simultaneously may be the transmission memory of the bus controller, is limited. The receiving means however reads out the received bus messages so rapidly and in advance from the message memory that the respective memory location or slot of the message memory is quickly ready for the writing in of freshly received bus message. Which bus messages are respectively to be received, is marked by the receiving means, as explained above, in the message memory of the bus controller.

It will be apparent that in the message memory only bus message which are only to be received or only to be transmitted or to be transmitted and received may be stored.

In the following one working example of the invention will be described with reference to the accompanying drawings.

Figure 1:
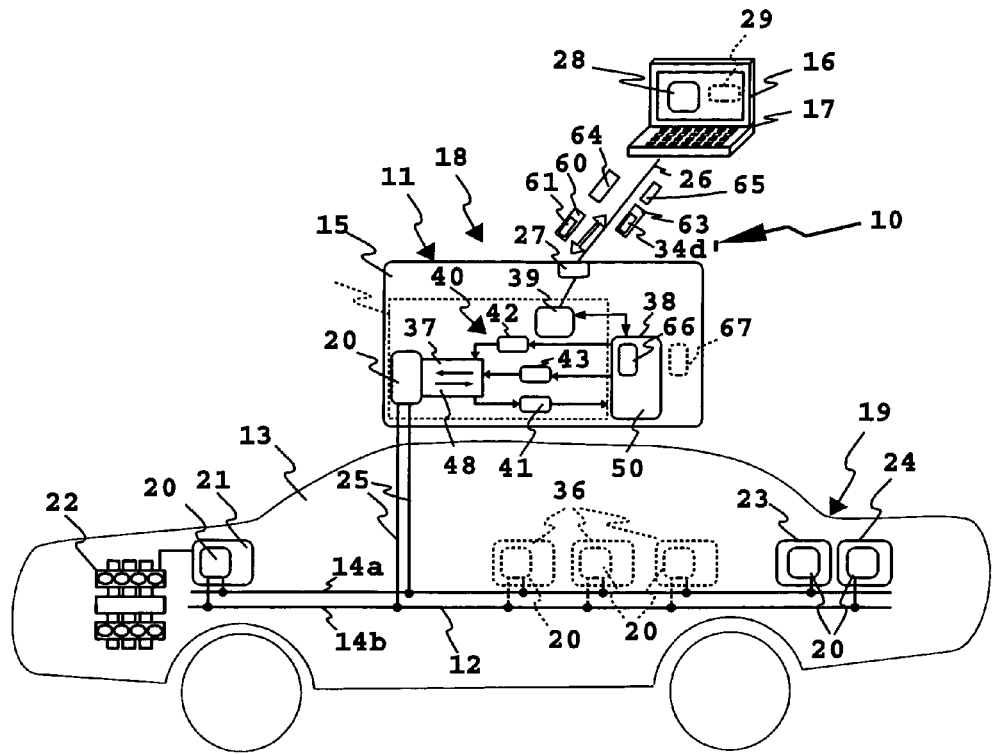
FIG. 1 is a diagrammatic view of a test device for testing a bus of a motor vehicle.
Figure 2:
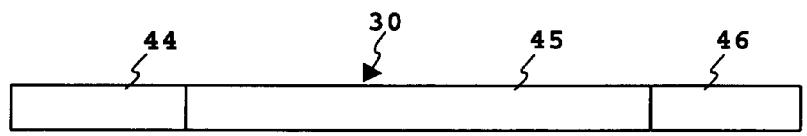
FIG. 2 is a diagrammatic showing of a bus message which is transmitted on the motor vehicle bus.
Figure 3:
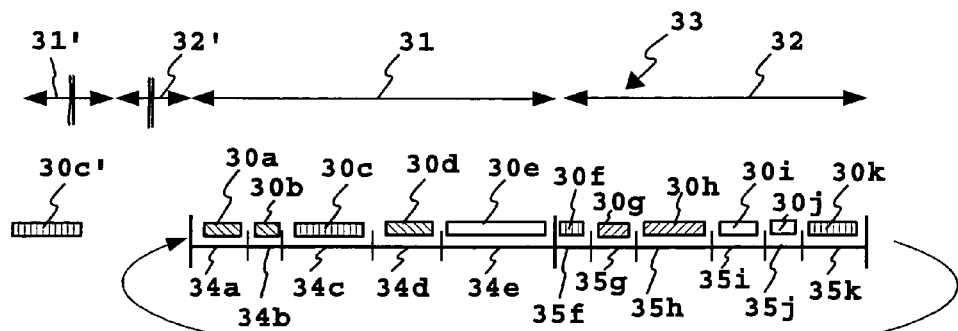
FIG. 3 shows a transmission cycle sequence with two transmission cycles, during which bus messages are transmitted on the motor vehicle bus.

A test arrangement 10 includes a test device 11 for connection with a motor vehicle bus 12 of a motor vehicle 13. The motor vehicle bus 12 is a FlexRay bus.

The motor vehicle bus 12 comprises channels 14a and 14b. The test device 11 can also be termed a bus coupler 15 for an operating means 16. The operating means 16 comprises a PC or personal computer, as for example a notebook, which is able to be coupled by the bus coupler 15 to the motor vehicle bus 12.

All in all the test device 10 constitutes a simulation and analyzing tool 18 for simulation of the bus load on the bus 12 or for analysis of the bus messages transmitted by way of the bus 12.

Bus subscribers 19 are coupled with the motor vehicle bus 12, which respectively each include a bus controller 20. The bus subscribers 19 comprise for example an engine control device 21 for the control of an engine 22, a sensor 23 and furthermore an actuator 24 which are respectively coupled via a bus controller 20 on the motor vehicle bus 12. While engine control device 21 for example is coupled with both channels 14a and 14b, the sensors and actuators 23 and 24 are only coupled with respectively one of the channels 14a and 14b.

The test device 11 is coupled by way of connection leads 25 with the bus 12, i.e. in the present case with the two channels 14a and 14b, it being possible for the test device 11 to be only coupled with one of the channels 14a or 14b.

The operating means 16 is connected by way of a line 26 with the bus coupler 15. The line 26 is for example coupled with a control interface 27 of the test device 11. The operating means 16 comprises a simulation and analysis module 28, i.e. a program, which includes a program code able to be implemented by a processor 29 of the operating means 16.

The bus subscribers 19 and furthermore the test device 11 transmit bus messages 30a through 30k on the bus 12. The bus message 30a through 30e are bus message of a first transmission cycle 31, whereas the bus messages 30f through 30k are components of a second transmission cycle 32. The transmission cycles 31 and 32 are components of a transmission cycle sequence 33.

For the transmission of the bus messages 30a through 30e there are the slots 34a through 34e of the transmission cycle 31. The bus message 30f through 30k have the memory locations 35f through 35k of the transmission cycle 32.

The motor vehicle 13 is in a simulation or test stage. For example further, planned bus subscribers 36 are to be coupled with the bus 12, which however are not completely developed and later are to comprise a bus controller 20. One task of the test device 11 is to transmit bus messages instead of the planned bus subscribers 36 on the bus 12. For this purpose it would be necessary to provide three bus controllers 20 in the case of the test device 11, since one storage capacity 48 of the message memories 37 of the bus controllers 20 would not suffice to store all bus messages 30 to be transmitted by the planned bus subscribers 36. It is here that the invention provides a remedy.

The test device 11 comprises an intermediate memory 38, which ultimately serves to increase the capacity of the message memory 37. The intermediate memory 38 and the message memory 37 are however mutually separate units.

A communication function 39, as for example a software function, of the test device 11 receives at the control interface 27 from the simulation and analysis module 28 on the bus 12 bus messages 30 to be transmitted and writes them to the intermediate memory 38.

A transmission preparing means 40 reads from the intermediate memory 38 and writes the data therefrom for the bus messages 30 to be transmitted to the message memory 37.

In the receiving means a receiving function 41 is active, which forms a receiving means. The receiving function 41 reads bus messages 30 received by the bus controller 20 and written to the message memory 37 and writes the content thereof to the intermediate memory 38. The communication function 39 then reads the bus messages 30 received from the test device 11 out of the intermediate memory 30 and communicates them to the simulation and analysis module 28 of the operating means 16.

Each of the bus messages (30a through 30k) comprises a message head 44 and user data 45 and a check part 46. The bus messages 30 may also comprise further information, as for example time information or the like.

The task of the bus controller 20 s to manage communication on the motor vehicle bus 12. Same comprises for example the generation of check parts 46, a time synchronization with the respective other bus subscribers 19 and 36 or the like.

The planned bus subscribers 36, which are simulated by the test device 11, are for example to transmit the bus messages 30a, 30b, 30c and 30d. In the following this is characterized by the index s and indicated by oblique shading. The test device 11 is to go on receiving bus messages 30c, 30f and 30k, this being indicated by an index r and by vertical shading. The bus messages 30c, 30gf and 30k to be received are for example transmitted by the bus subscribers 19. The further bus message 30e, transmitted by one of the bus subscribers 19, is of no interest for the test device 11.

Admittedly the storage capacity 48 of the message memory 37 would be sufficient for the bus messages 30a, 30b, 30d, 30g and 30h of a bus message sequence 47 as such. However in the message memory 37 memory capacity received is to be reserved for the messages to be received so that in all the storage capacity 48 is insufficient for all bus messages 30 of the bus message sequence 47 to be transmitted.

The simulation and analysis module 28 transfers transmission data 65 for the bus messages 30a, 30b, 30d, 30g and 30h which are to be transmitted of the bus message sequence 47 to the test device 11. There the communication function 39 receives such bus message transmission data 65 and writes them as head data 54a, 54b, 54d, 54g and 54h together with user data 55a, 55b, 55d, 55g and 55h associated with such head data to memory locations 49 of the intermediate memory 38. The head data 54a and the user data 55a serve for example for the production of the bus message 30a.

Figure 4:
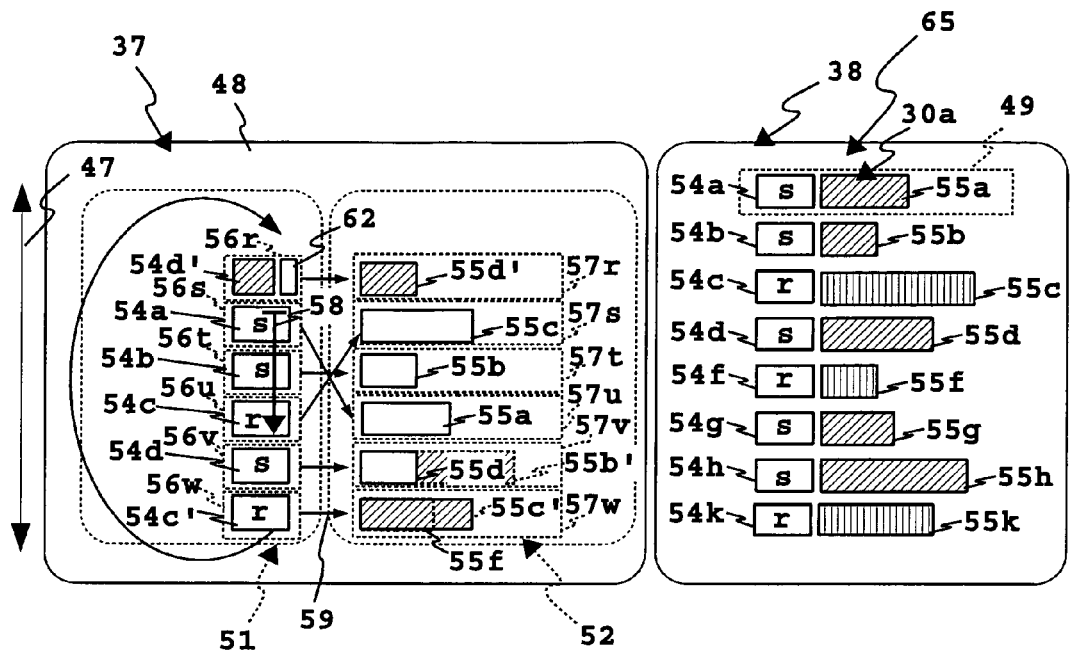
FIG. 4 shows diagrammatic views of a message memory and an intermediate memory of the test device in accordance with FIG. 1.
Figure 5:
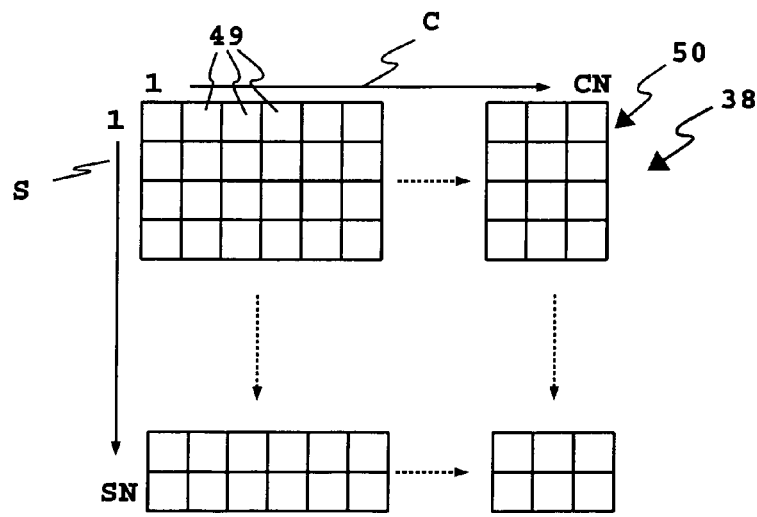
FIG. 5 shows a still further diagrammatic view of the intermediate memory according to FIG. 4.

The intermediate memory 38 has a substantially larger storage capacity 50 than the message memory 37 of the bus controller 20, which only has a smaller storage capacity 48 for the storage of approximately six bus messages 30 to be transmitted and received. In the case of the representation of FIG. 4 in all eight of the memory locations 49 are illustrated for example. The intermediate memory 38 can for example be matrix-organized, one set of memory locations or slots S, which are available in the cycles C for the transmission and reception of bus message 30 on the bus 12, constituting the lines and columns of such matrix. For example a FlexRay bus may have a maximum number of CN slots, such cycles being able to have a maximum number of SN slots. In the case of the FlexRay bus for example 2,048 slots and 64 cycles are possible. It will be clear that the memory locations 49 are preferably dynamically organized so that the storage capacity 50 is optimally utilized, The preceding writing of data for bus messages 30 from the intermediate memory 38 to the message memory 37 and vice versa in the opposite direction the to the timely reading of received bus messages 30 from the message memory 37 and transmission to the intermediate memory 38 takes place in the following manner:

A head function 42, which constitutes a head preparing means, writes in advance of a user data function 43 the head data 54a, 54b, 54d, 54g or 54h of the respectively next bus messages to be transmitted from the intermediate memory 38 in a head data portion 51 of the message memory 37 to one of the memory locations 56r through 56w.

A user data function 43, which constitutes a user data preparing means, writes the user data 55a, 55b, 55d, 55g and 55h corresponding to the head data 54a, 54b, 54d, 54g and 54h, to user data memory locations 57r through 57w of a user data part 52 of the message memory 37.

For an locked phase 58 the bus controller 20 in the test device 11 blocks bus messages 30 due for transmission. Accordingly the memory locations 56s, 56t and 56u for example are blocked for the bus messages 30a and 30b due for transmission and also the bus message 30c to be received at the transmission location or slot 34c. The head data memory locations 56s, 56t and 56u are blocked for the head function 42. The head function 42 has however already offered the head data 54a and 54b at the memory locations 56s and 56t. Even before the bus controller 20 has blocked the following head data memory location 56v to avoid writing of data, the head function 42 writes the head data 54d to the memory location 56v. The head function 42 accordingly works in advance of the bus controller 20.

The user data function 43 is able to take its time for the writing of data to the user data portion 52. Admittedly the user data function 43 may for example not modify the user data 55a of the bus message 30a currently to be transmitted, because the bus controller 20 already needs the user data 55a stored there for forming the bus message 30a and accordingly appropriately blocks the memory location 57u. The user data 55b on the other hand, which are associated with the bus message 30b, can not be modified by the user data function 43. Accordingly it is possible for, to take an example, the communication function 39 to manipulate the user data 55b in the intermediate memory 38 and for the user data function 43 to modify them at short notice, and write the user data 55b to the message memory 37 at the memory location 57t, while the bus controller 20 is already transmitting the bus message 30a on the bus 12. Accordingly the test device 10 can highly dynamically transmit bus messages 30 on the bus for simulation purposes.

Obviously the head function 42 and the user data function 43 may alter the bus messages 30 to be transmitted further in the future in the message memory 37 and for example write the head data 54*d* and user data 55*d* to memory locations 56*v* and 57*v*. The memory location 57*v* for example contains user data 55*b*' as well from a preceding transmission cycle 31'. The user data 43 overwrites the user data 55*b*' with the user data 55*d*.

The receiving function 41 also operates in advance of the bus controller 20. Thus the receiving function 41 for example reads the memory locations 56*w* and 57*w* in good time prior to rewriting by the bus controller 20. At the memory locations 56*w* and 57*w* there are for example user data 54*c*' and 55*c*' of a bus message 30' of a transmission cycle 31' preceding the current transmission cycle 31. The receiving function 41 transfers the data of the bus message 30*c*' into the intermediate memory 38, whence they are read by the communication function 39 and transferred to the simulation and analysis module 28. For this the intermediate memory 38 receives for this, for example, a reception queue 66 and/or a reception queue 67 separate from the intermediate memory 38 is provided. The memory locations 56*w* and 57*w* are therefore already read by the receiving function 41, when the head function 42 and the user data function 43 write new head data 54*f* and user data 55*f* of the current transmission cycle 32' to these memory locations.

There are still head data 54*d*' and 55*d*' of a bus message 34*d*' of the transmission cycle 31' at the memory locations 56*r* and 57*r*.

Pointers are directed to the user data memory location 57*r* through 57*w* among the head data memory locations 56*r* through 56*w*, this being indicated by the arrows 50.

The test device may also "force" the bus controller 20 to receive bus messages 30. When a bus controller 20 for example receives bus messages without a content, so-called zero or the like, it will not normally write, or will only do so partially, to the message memory 37. For bus analysis purposes however it may be appropriate also to receive zero or bus messages 30, which are to the discarded, and for example to issue them with the aid of the simulation and analysis module 28.

The receiving function 41 marks for example the respective bus message 30*c* and 30*f* to be "forcedly" received or, respectively, the portions associated with the associated slots 34*c* and 35*f* of the transmission cycles 31 and 32 with a reception mark r, which signalizes that the bus messages 30 are to be received at the slots 34*c* and 35*f* in any case. For this purpose the receiving function 41 receives for example a control instruction 64 from the simulation and analysis module 28. Thus for example at the head data memory locations 56*u* and 56*w* there is the received mark r. When the bus controller 20 writes the data of received bus messages, same will be read by the receiving function 41 and issued to the control interface 27. When for example the user data of the bus message 30*c*' do not contain any information, for example only zero information, i.e. the bus message 30*c*' was a so-called zero frame, the receiving function 41 preferably transmits a message 60 with a zero mark 61 to the control interface 27.

Furthermore the test device 11 preferably acknowledges bus messages 30 transmitted on the bus 12. The bus controller 20 for example marks bus messages transmitted on the bus 12 with a transmission mark 62. The receiving function 41 finds. on the basis of the transmission mark 62, that the respective bus message 30 has been transmitted on the bus 12, for example the bus message 30*d*' of the transmission cycle 31' and finds for the respectively transmitted bus messages 30, for example the bus messages 30*d*', an acknowledging message 63. The acknowledging message 63 comprises data of the bus message 30*d*', and preferably the entire bus message 30*d*'.

The communication function 39, the receiving function 41, the head function 42 and the user data function 43 are preferably designed as so-called engines, i.e. for example an update engine, an Rx engine, header engines and Ts engines. The functions 39, 41, 42 and 43 preferably together take place cyclically one after the other, for example using mutually consecutive calls, and an operating system (not illustrated), using a central control block or the like. Accordingly collisions between the individual functions 39, 41, 42 and 43 are avoided so that for example the data in the intermediate memory 38 are always consistent.

The bus controller 20 and the functions 39 and 41 through 43 are for example components of a field programmable gate array (FPGA). It will be apparent that furthermore other designs are possible, for example as software implemented by a processor, or the like.

What is claimed is:

1. A test device for a motor vehicle bus, the test device comprising:
    a bus controller for the transmission and reception of bus messages, the bus controller having a message memory for offering transmission data for bus messages, the message memory having a storage capacity for one bus message sequence with bus messages to be transmitted within a single transmission cycle or a transmission cycle sequence;
    an intermediate memory for the storage of transmission data for bus messages with a larger storage capacity than the message memory; and
    a transmission preparing means for reading the transmission data from the intermediate memory and for writing, preceding a reading of the bus controller, to the message memory of the bus controller so that the bus message sequence is expanded by additional bus messages, which are transmitted by the bus controller within the transmission cycle or the transmission cycle sequence on the motor vehicle bus
    wherein the transmission preparing means comprises a head preparing means for writing head data to the message memory and a user data preparing means for writing user data to the message memory, the head data being provided for the production of message heads of the bus message and the user data being provided for the user data respectively following the message heads, of the bus messages, the head preparing means writing the message heads, before the user data preparing means writes the associated user data to the message memory, so that the user data preparing means can modify the user data during an locked phase, in which the bus controller in advance blocks the writing of message heads to the message memory prior to the transmission of a respective bus message.

2. The test device as set forth in claim 1, wherein the storage capacity of the message memory is provided for a maximum number of bus messages dependent on a size of the bus messages.

3. The test device as set forth in claim 1, wherein the bus is designed for time division multiple access, and is more particularly a FlexRay bus.

4. The test device as set forth in claim 1, wherein for the reception of transmission data to be written to the intermediate memory the test device comprises a control interface for an operating means and more particularly a personal computer.

5. The test device as set forth in claim 1, wherein the test device comprises means for the transmission of acknowledging messages by way of a control interface, the acknowledging messages acknowledging bus messages that are transmitted on the motor vehicle bus by the bus controller.

6. The test device as set forth in claim 4, wherein the test device comprises means for reading out received bus messages from the message memory and for the transfer of the received bus messages to the intermediate memory and/or the control interface, the test device reading a memory location containing a received bus message of the message memory before rewriting by the bus controller.

7. The test device as set forth in claim 5, wherein the acknowledging messages contain the content of the transmitted bus messages completely or partially.

8. The test device as set forth in claim 1, wherein the bus controller comprises means for writing bus messages of other bus subscribers to the message memory which are transmitted by other bus subscribers between bus messages respectively to be transmitted by other bus subscribers within or outside the bus message sequence.

9. The test device as set forth in claim 1 further comprising a receiving means which gives the bus controller control instructions for the reception of bus messages at predetermined transmission slots of the motor vehicle bus.

10. The test device as set forth in claim 9, wherein the receiving means comprises means for writing a received mark for transmission slots to the bus controller at which the bus controller is to receive bus messages.

11. The test device as set forth in claim 10, wherein each memory location of the message memory is associated with the transmission location of the motor vehicle bus and that the receiving means comprises means for marking memory locations for respective bus messages to be received in the message memory with the received mark, the bus controller writing the received bus messages to the memory locations provided with the mark.

12. The test device as set forth in claim 10, wherein the bus controller writes a zero mark or a zero information mark to memory locations, if the memory location has a received mark associated with it and the bus controller has not received any bus message or a bus message with zero information to the respective transmission slot and that the receiving means comprises means for the issue of the zero mark and the zero information mark to the control interface.

13. The test device as set forth in claim 1, wherein the bus messages received in the message memory and to be transmitted are be stored.

* * * * *